(12) United States Patent
Inoue et al.

(10) Patent No.: US 7,448,308 B2
(45) Date of Patent: Nov. 11, 2008

(54) VACUUM TYPE BOOSTER DEVICE

(75) Inventors: Yoji Inoue, Toyoake (JP); Masaki Nakagawa, Handa (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 181 days.

(21) Appl. No.: 11/637,161

(22) Filed: Dec. 12, 2006

(65) Prior Publication Data
US 2007/0144339 A1 Jun. 28, 2007

(30) Foreign Application Priority Data
Dec. 26, 2005 (JP) ............................. 2005-372948
Nov. 13, 2006 (JP) ............................. 2006-306578

(51) Int. Cl.
*F15B 9/10* (2006.01)
(52) U.S. Cl. .................................... 91/369.2; 91/376 R
(58) Field of Classification Search ............... 91/369.2, 91/376 R
See application file for complete search history.

(56) References Cited

U.S. PATENT DOCUMENTS

| | | | |
|---|---|---|---|
| 3,897,716 A * | 8/1975 | Ramage et al. ........... | 91/376 R |
| 3,972,263 A * | 8/1976 | Welsh, Jr. ................ | 91/369.2 |
| 5,056,413 A | 10/1991 | Kaub | |
| 5,778,754 A * | 7/1998 | Kaub ........................ | 91/369.2 |
| 5,787,788 A | 8/1998 | Gautier et al. | |
| 5,826,484 A * | 10/1998 | Gautier et al. ............. | 91/376 R |
| 7,370,571 B2 * | 5/2008 | Tsubouchi et al. ......... | 91/369.2 |

FOREIGN PATENT DOCUMENTS

| | | |
|---|---|---|
| JP | 06-016127 | 1/1994 |
| JP | 6-24922 | 4/1994 |
| JP | 07-137626 | 5/1995 |
| JP | 09-193785 | 7/1997 |
| JP | 10-510228 | 10/1998 |
| JP | 2004-359050 | 12/2004 |

OTHER PUBLICATIONS

U.S. Appl. No. 11/447,899, filed Jun. 7, 2006, Kaoru Tsubouchi et al., "Negative Pressure Type Booster Device".
U.S. Appl. No. 10/581,931, filed Jun. 7, 2006, Kaoru Tsubouchi et al., "Negative Pressure Type Booster Device".

* cited by examiner

*Primary Examiner*—Michael Leslie
(74) *Attorney, Agent, or Firm*—Buchanan Ingersoll & Rooney PC

(57) ABSTRACT

A valve piston 8 of a vacuum type booster device is provided with a bypass passage 51 which is defined between a sound-absorbing member 27 and an input rod 23 to communicate directly with the atmosphere and a sliding-type plate valve 52 composed of three plate valve parts 53, 54 55 which are arranged around the input rod 23 to be relatively slidable in radial directions. When the input rod 23 is advanced beyond a predetermined distance relative to the valve piston 8, the sliding-type plate valve 52 is separated between two of the plate valve parts 53, 54, 55 to make the bypass passage 51 communicate with the inside of the valve piston 8.

11 Claims, 6 Drawing Sheets

VACUUM TYPE BOOSTER DEVICE

INCORPORATION BY REFERENCE

This application is based on and claims priority under 35 U.S.C. 119 with respect to Japanese Applications No. 2005-372948 filed on Dec. 26, 2005 and No. 2006-306578 filed on Nov. 13, 2006, the entire contents of which are incorporated herein by reference.

BACKGROUND OF THE INVENTION

1. Field of the Invention

The present invention relates to a vacuum type booster device for vehicles and particularly, to a vacuum type booster device capable of being highly responsive when a brake pedal is stepped on strongly.

2. Discussion of the Related Art

Generally, in vacuum type booster devices, when the stepping of a brake pedal advances an input rod which thus causes a plunger to advance relative to a valve piston, a vacuum valve comes into contact with a vacuum valve seat to block the communication between a variable pressure chamber and a constant pressure chamber. When the plunger is further advanced then, an atmosphere valve seat is separated from an atmosphere valve, whereby the atmospheric air is admitted from the surrounding atmosphere to the variable pressure chamber through a sound-absorbing member and a filter element. Thus, the valve piston is moved forward in dependence on a pressure difference between the variable pressure chamber and the constant pressure chamber to push a master piston, whereby a brake oil pressure corresponding to the steeping force of the brake pedal is generated in a master cylinder.

Since the valve piston elastically deforms a reaction member by an operation power corresponding to the pressure difference between the variable pressure chamber and the constant pressure chamber to push the master piston, the reaction member under the elastic deformation pushes the plunger rearward. This causes the plunger to retract, so that the atmosphere valve seat is seated on the atmosphere valve to block the communication of the variable pressure chamber with the atmosphere and hence, to hold the brake oil pressure at a desired pressure.

Although it is required to lead the atmospheric air to the variable pressure chamber without delay when the brake pedal is stepped on strongly, the use of the sound-absorbing member makes it difficult due to a ventilation resistance thereacross to lead a sufficient volume of the atmospheric air to the variable pressure chamber, and this makes a cause of difficulty in enhancing the responsiveness in braking operation. Particularly, improvement has been required these days with an increasing desire for shortening the time for vehicle to stop after braking.

As one satisfying such desire, there has been known a vacuum type booster device as described in U.S. Pat. No. 5,056,413 (equivalent of Japanese Examined Published Patent No. 6-24922). In the device described in the patent, a sleeve is provided around a valve housing (valve piston), and an additional annular air passage is defined between the sleeve and the valve housing to open to a rearward chamber (variable pressure chamber). An additional valve member is formed at the rear end of the sleeve and is biased toward a third valve seat so that the same is usually held closed by the additional valve member. When a brake pedal is stepped on sharply to advance an operating member (input rod) beyond a predetermined distance relative to the valve housing, the additional valve member formed at the rear end of the sleeve is separated from the third valve seat. This causes the atmospheric air from a filter element not only to flow into the rearward chamber through an inner space and an intermediate space, but also to flow into the rearward chamber through the additional air passage. As a consequence, the pressure in the rearward chamber rapidly comes to be equal to the atmospheric air, so that the braking responsiveness can be enhanced.

However, in the device described in the aforementioned patent, since an additional sleeve defining the additional air passage is provided around the valve housing, a problem arises in that the vacuum type booster device is enlarged in dimension. Further, since the third valve seat has to be newly provided for communication/blocking of the additional air passage with the atmosphere, there arises another problem that the reliability as product is lowered. In addition, the valve housing and the sleeve are required to be slidable, wherein sliding support portions therefor receive all the loads which act on the valve housing, and are very difficult to perform smooth sliding, so that an additional problem arises in that the functions in the beginning are difficult to be performed stably.

SUMMARY OF THE INVENTION

Accordingly, it is a primary object of the present invention to provide an improved vacuum type booster device which is high in responsiveness and which is more simple and compact.

Briefly, according to the present invention, there is provided a vacuum type booster device which comprises a booster shell movably supporting a partition member partitioning the interior of the booster shell into a variable pressure chamber and a constant pressure chamber; a valve piston secured to the partition member at a base portion thereof and having a vacuum valve seat formed thereon for selective communication of the variable pressure chamber with the constant pressure chamber; an output rod connected to the valve piston; a reaction member for transmitting an output of the partition member depending on the pressure difference between the variable and constant pressure chambers, from the valve piston to the output rod; a plunger operable in connection with the reaction member and having an atmosphere valve seat formed thereon; an input rod connected to the plunger for axially moving the plunger when the input rod is axially moved by a brake pedal; and a valve member having a vacuum valve and an atmosphere valve formed thereon, the vacuum valve being contactable with the vacuum valve seat of the valve piston for making the variable pressure chamber communicate selectively with the constant pressure chamber, the atmosphere valve being contactable with the atmosphere valve seat of the plunger for making the variable pressure chamber communicate selectively with the atmosphere. The vacuum type booster device further comprises a sound-absorbing member fitted at its outer surface in the internal surface of the valve piston and having an internal surface which is sufficiently larger in diameter than the input rod for defining a bypass passage which leads the atmospheric air to the atmosphere valve inside the valve piston without passing through the sound-absorbing member; and a sliding-type plate valve composed of at least two plate valve parts which are relatively slidable in radial directions and separable from each other in an axial direction, wherein the at least two plate valve parts are held in a face-to-face contact in a first operation state for blocking the communication of the bypass passage with the atmosphere valve inside the valve piston, but are separated axially from each other in a second operation state that the input rod is advanced beyond a predetermined distance relative to the valve piston, to establish a radial passage which makes the bypass passage communicate with the atmosphere valve inside the valve piston.

With this construction, it can be realized to admit the atmospheric air directly inside the valve piston through the bypass passage defined between the sound-absorbing member and the input rod, so that the responsiveness in the braking operation can be heightened reliably. In addition, since the vacuum type booster device takes the construction that the bypass passage is selectively opened and closed by the sliding-type plate valve composed of the at least two plate valve parts which are relatively slidable in radial directions and separable in the axial direction, the heightening of the responsiveness in the braking operation can be achieved with a construction which is very simple and compact.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Figure 1:
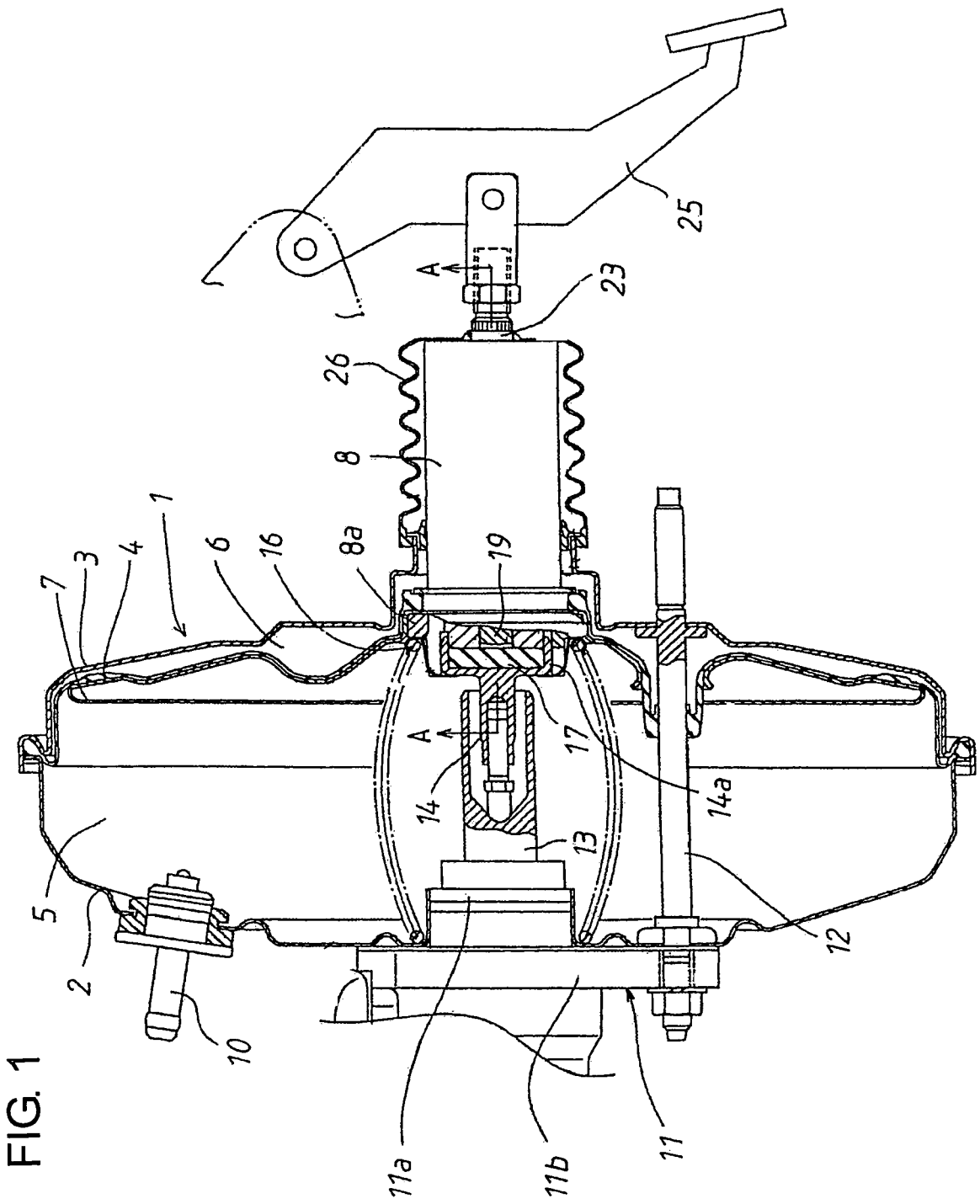
FIG. 1 is a longitudinal sectional view of a vacuum type booster device in a first embodiment according to the present invention.

Hereinafter, a vacuum type booster device in a first embodiment according to the present invention will be described with reference to FIGS. 1 through 5. Referring now to FIG. 1, a booster shell 1 is composed of a front shell 2 and a rear shell 3. Between the both shells 2 and 3, a flexible diaphragm 4 serving as partition member is secured air-tightly at its outer circumferential bead portion and partitions the interior of the booster shell 1 into a constant pressure chamber 5 and a variable pressure chamber 6. A disc-like plate 7 is laminated to the diaphragm 4 within the constant pressure chamber 5. A cylindrical valve piston 8 is air-tightly secured to the diaphragm 4 and the plate 7 at the outer surface of a base portion 8a thereof and exposes the forward end surface of the base portion 8a to the constant pressure chamber 5. A vacuum pressure leading conduit 10 is attached to the front shell 2, and the constant pressure chamber 5 is in communication with an intake manifold of a combustion engine (both not shown) through the vacuum leading conduit 10 thereby to be kept at a predetermined vacuum pressure during the operation of the combustion engine.

Figure 2:
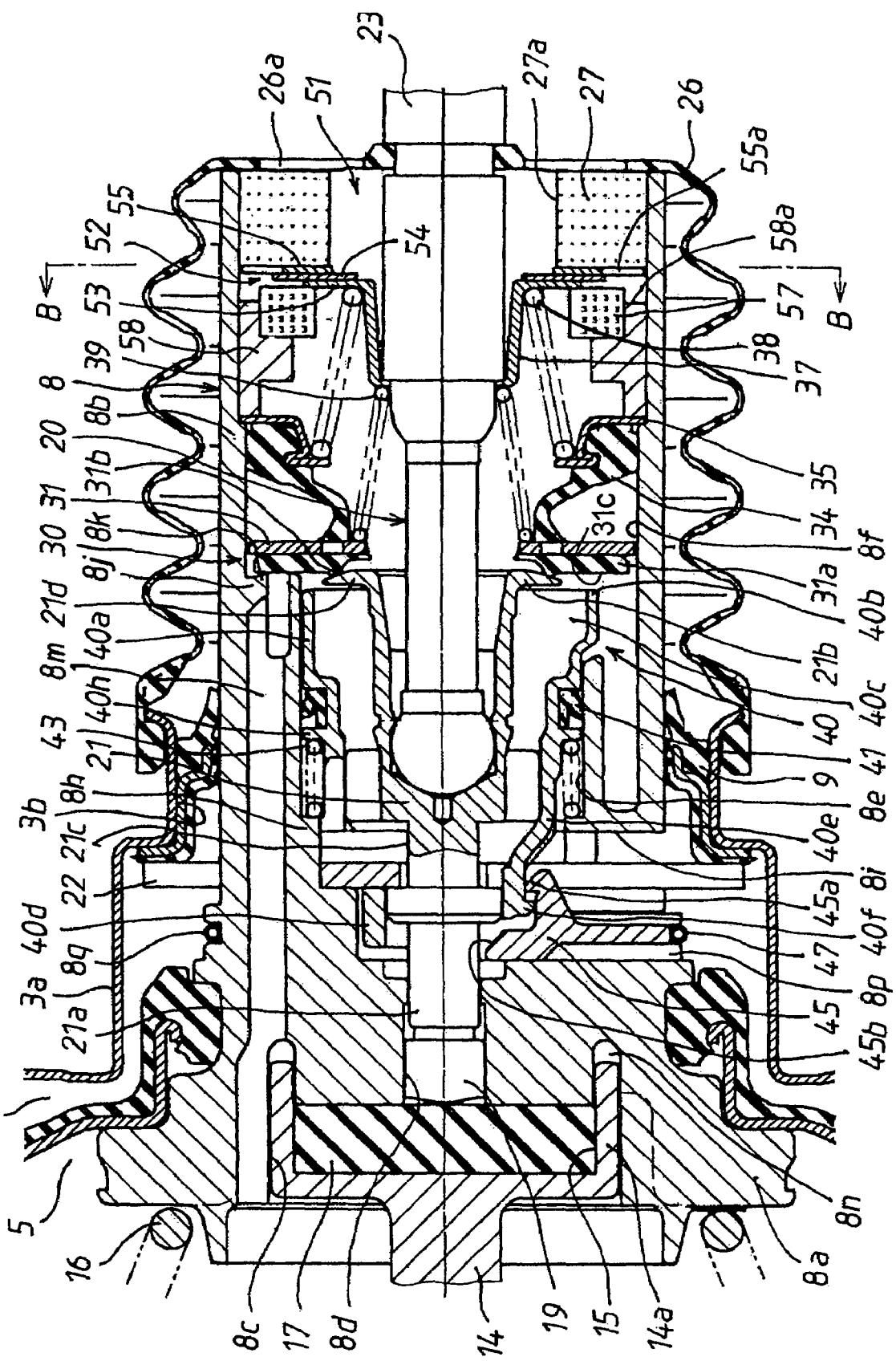
FIG. 2 is an enlarged fragmentary sectional view, taken along the line A-A in FIG. 1, of a valve mechanism section incorporated in the vacuum type booster device.

As best shown in FIG. 2, the rear shell 3 is bent at its center portion outwardly thereby to protrude a cylindrical protruding portion 3a rearward and has a through hole 3b formed to extend on the axis of the rear shell 3. The valve piston 8 protrudes a sliding cylindrical portion 8b rearward from the base portion 8a, and the sliding cylindrical portion 8b passes through the through hole 3b to protrude rearward from the protruding portion 3a of the rear shell 3. A sealing element 9 is interposed between the internal surface of the through hole 3b and the outer surface of the sliding cylindrical portion 8b to block the variable pressure chamber 6 air-tightly from the atmosphere.

Referring again to FIG. 1, a numeral 11 denotes a master cylinder, which at its rear end portion 11a, passes through a center hole formed at the center portion of the front shell 2 to air-tightly protrude into the constant pressure chamber 5, with a flange portion 11b thereof being in abutting engagement with the forward end surface of the front shell 2. The front shell 2 and the rear shell 3 are joined with each other with several (e.g., two) tie rods 12, each of which extends in parallel with the axis of the booster shell 1 composed of the both shells 2, 3 at almost radial mid position between the axis and the outer surface of the booster shell 1, and are secured to the master cylinder 11. A sliding hole of each sealing portion formed on the diaphragm 4 is fitted on each tie rod 12 to be air-tightly slidable therealong as it keeps the air-tight partitioning between the constant pressure chamber 5 and the variable pressure chamber 6.

A master piston 13, which is inserted into the master cylinder 11 slidably in the forward-rearward direction, protrudes from the rear end portion of the master cylinder 11 into the constant pressure chamber 5 to extend close to the forward end of the valve piston 8. An output rod 14 is interposed between the valve piston 8 and the master piston 13. The valve piston 8 transmits the output of the diaphragm 4 depending on the pressure difference between the constant pressure chamber 5 and the variable pressure chamber 6, to the output rod 14 through a reaction member 17 thereby to make the output rod 14 push the master piston 13 forward. A return spring 16 is interposed between the front shell 2 and the forward end surface of the valve piston 8 to urge the same rearward.

As best shown in FIG. 2, a reaction force chamber hole 8c, a reaction force hole 8d opening to the reaction force chamber hole 8c and being smaller in diameter than the reaction force chamber hole 8c, a plunger receiving hole 8e and a valve member receiving hole 8f being larger in diameter than the plunger receiving hole 8e are formed in the valve piston 8 in series from the forward end surface toward the rear end surface of the valve piston 8 on the axis of the same. An annular recess 8n is axially formed in the reaction force chamber hole 8c. An annular protrusion 14a formed at the rear end of the output rod 14 is inserted into the annular recess 8n axially slidably relative to the valve piston 8. Thus, a reaction force chamber 15 is defined between the annular protrusion 14a and the base portion 8a of the valve piston 8, and the disc-like reaction member 17 made of an elastic material is received in the reaction force chamber 15.

Further, a numeral 21 designates a plunger whose forward end rod portion 21a is slidably received in the reaction force hole 8d. The forward end surface of the forward end rod portion 21a is in abutting engagement with the rear end surface of an abutting member 19, which is slidably received in the reaction force hole 8d. An atmosphere valve seat 21b is formed on the rear end surface of the plunger 21.

A numeral 22 denotes a key member taking the shape of "H" letter, and the relative movement amount of the plunger 21 to the valve piston 8 is restricted by the key member 22. Straight portions formed at the opposite sides of the key member 22 have their inner sides which partly get in an annular engaging groove 21c formed on the plunger 21 to be relatively movable by a predetermined amount in the forward-rearward direction. The straight portions of the key member 22 pass through two rectangular holes 8i, which are formed radially between the base end portion 8a and the plunger receiving hole 8e, as they are guided at outer side surfaces thereof along the rectangular holes 8i, and extend both end portions radially outwardly of the valve piston 8. The dimension of the thickness of the key member 22 in the forward-rearward direction is smaller than the dimension of the rectangular holes 8i in the forward-rearward direction, so that the key member 22 is also movable relative to the valve piston 8 by a predetermined amount in the forward-rearward direction. Further, the key member 22 is able to abut on the end surface of the protruding portion 3a of the rear shell 3 at their opposite ends protruding from the external surface of the valve piston 8. Thus, the valve piston 8 and the plunger 21 are able to axially move relative to each other by a limited distance which is determined by subtracting double the thickness of the key member 22 from the sum of the widths in the forward-rearward direction of the rectangular holes 8i and the annular engaging groove 21c.

The rear end of the plunger 21 is connected to an input rod 23 as the same is swingable relative to the plunger 21 about its pivotal center which is defined at the center of a spherical surface formed at the front portion of the input rod 23. The input rod 23 passes through a sound-absorbing member 27 having a sound absorption function, extends rearward beyond the sliding cylindrical portion 8b and is connected to a brake pedal 25 (shown in FIG. 1) in a usual manner. The plunger 21 and the input rod 23 constitute an input member 20 which is axially movable by the brake pedal 25.

A bellows 26 is secured between the input rod 23 and the protruding portion 3a of the rear shell 3 to cover the external surface of the sliding cylindrical portion 8b of the valve piston 8. A plurality of vent holes 26a whose centers are arranged on a circle are opened at the end surface of the bellows 26, and the atmospheric air is admitted from these vent holes 26a into the valve piston 8 through the sound-absorbing member 27.

As shown in FIG. 2, a valve mechanism 30 is further provided for making the variable pressure chamber 6 communicate selectively with the constant pressure chamber 5 and the atmosphere. In the valve mechanism 30, a section portion of a valve receiving hole 8f of the valve piston 8 and a rearward extension portion of the plunger receiving hole 8e define two flat surface portions 8j each taking the shape of a curved, elongate circle, and two first vacuum valve seats 8k are protruded from the two flat surface portions 8j of the curved, elongate circular shape to be symmetrical with respect to the axis of the valve piston 8. Each first vacuum valve seat 8k is formed on each flat surface portion 8j and takes the shape of a closed loop ridge or ledge protruding along the circumference of each ellipse which is curved or crooked along an arc having the center on the axis of the valve piston 8. Passages 8m surrounded by the first vacuum valve seats 8k pass through the side wall of the valve piston 8 to open to the constant pressure chamber 5. An atmosphere valve seat 21b is formed at the rearward surface of an extension portion which is formed at the rear end portion of the plunger 21, to surround an air leading passage formed at the internal surface of the valve member receiving hole 8f. A disc-like valve member 31 is loosely received in the valve member receiving hole 8f to be movable in the forward-rearward direction. Formed at the forward end surface of the valve member 31 are first vacuum valves 31a of a flat shape, which are brought selectively into contact with or separation from the first vacuum valve seats 8k for bringing the variable pressure chamber 6 selectively into communication with the constant pressure chamber 5 or isolation from the same. The forward end surface of the valve member 31 annually protrudes an atmosphere valve 31b at a portion which is smaller in diameter than the first vacuum valves 31a. The atmosphere valve 31b is selectively brought into contact with or separation from the atmosphere valve seat 21b, so that the variable pressure chamber 6 is selectively isolated from the atmosphere or is made to communicate with the same.

Figure 5:
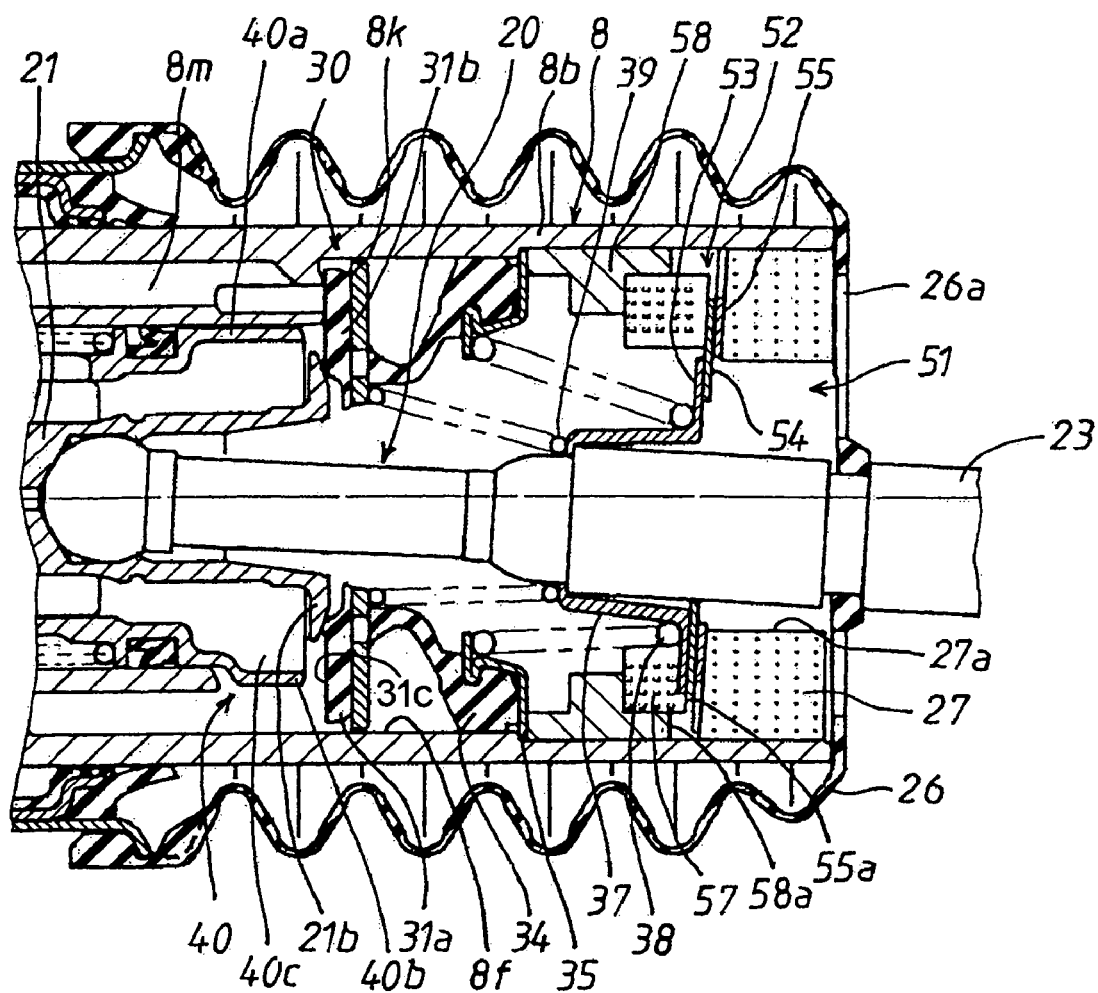
FIG. 5 is a fragmentary sectional view showing the operation state with an input member being swung.

As shown in FIGS. 2 and 5, the rear end of the valve member 31 is connected to an annular holder 35 by means of a bellows 35 which allows the valve member 31 to move in the axial direction. The holder 35 is fitted in the internal surface of the valve member receiving hole 8f and is urged by means of the resilient force of a compression spring 38 which is interposed between itself and a spring seat 37 immovably engaged on the axial mid portion of the input rod 23, to be pressured on a stepped shoulder portion of the valve receiving hole 8f.

Another compression spring 39 is interposed between the rear end surface of the valve member 31 and the spring seat 37 to urge the valve member 31 forward relative to the input rod 23. Thus, in an ordinary state (i.e., the state of non-braking operation), the atmosphere valve 31b is held in contact with the atmosphere valve seat 21b to block the communication of the variable pressure chamber 6 with the atmosphere, and to hold the first vacuum valves 31a at a position where the first vacuum valves 31a are slightly separated from the first vacuum valve seats 8k so that the variable pressure chamber 6 and the constant pressure chamber 5 communicate with each other.

A numeral 40 denotes a valve seat member surrounding the plunger 21, and the rearward cylindrical portion 40a of the valve seat member 40 is axially slidably fitted in the internal surface of the plunger receiving hole 8e of the valve piston 8 with a seal element 41 air-tightly provided therebetween. The cylindrical portion 40a of the valve seat member 40 is provided at its rear end with second vacuum valve seats 40b surrounding the atmosphere valve seat 21b, and in the ordinary state, the second vacuum valve seats 40b are positioned slightly ahead of the first vacuum valve seats 8k so that they do not contact with the valve member 31. As shown at the lower-half in FIG. 2, the rear end of the cylindrical portion 40a of the valve seat member 40 is partly expanded in the radial direction at two positions each of which is circumferentially different from the first vacuum valve seats 8k, that is, circumferentially between the two first vacuum valve seats 8k, and the second vacuum valve seats 40b define main air leading portions 40c at the two expanded portions thereof. A compression spring 43 for urging the valve seat member 40 rearward is interposed between an annular protrusion 40h which is protruded at the outer surface of the cylindrical portion 40a of the valve seat member 40 and an annular stepped portion 8h which is formed on the internal surface of the plunger receiving hole 8e.

The valve seat member 40 is provided at its forward end portion with an annular engaging portion 40d which is slidably fitted on a large diameter portion formed on the forward end rod portion 21a of the plunger 21. The engaging portion 40d and the cylindrical portion 40a are joined by two linking portions 40e. At the radial opposite sides of the forward end rod portion 21a, the two linking portions 40e are put between the both straight portions of the key member 22 taking the shape of "H" letter and is prevented from coming off in such a manner that a cross beam portion of the key member 22 is held contacted with the outer surface of one of the liking portions 40e while engaging portions formed inner sides of the both straight portions are held engaged with the outer surface of the other liking portion 40e. Thus, the valve seat member 40 is prevented by the key member 22 from rotation, so that the pair of air leading portions 40c are held at the same angular phase as the key member 22 to be located between the two first vacuum valve seats 8k in the circumferential direction. The two liking portions 40e pass through cutouts formed on the annular stepped portion 8h and through communication grooves to extend from the plunger receiving hole 8e to the rectangular holes 8i. The communication grooves are axially formed at a fitting portion of the plunger 21 which is fitted in the annular stepped portion 8h.

Within the valve piston 8, latch member receiving grooves 8p forming two radially opposed flat surfaces are formed ahead of the rectangular holes 8i at two places in the circumferential direction, and latch members 45 are held within the latch member receiving grooves 8p to be movable radially. The latch members 45 are provided with claw potion 45a, which are engageable with engaging protrusions 40f formed at the forward end of the valve seat member 40, respectively. By the engagements of the latch members 45 with the valve seat member 40, the valve seat member 40 is held to take such an ordinary position thereof that the second vacuum valve seats 40b separate forward from the valve member 31, against the resilient force of the compression spring 43. A garter spring 47 received in an annular groove 8q formed on the valve piston 8 is engaged with the radial outer ends of the latch members 45, so that the latch members 45 are urged by the garter spring 47 toward the radial inward direction to make the claw portions 45a engage respectively with the engaging protrusions 40f.

A cam surface 45b is formed on the internal surface of each latch member 45. When the plunger 21 is moved forward beyond the predetermined distance relative to the valve piston 8, the plunger 21 is brought into engagements with the cam surfaces 45b to push the latch members 45 radially outward against the resilient force of the garter spring 47, so that the claw portions 45a can be disengaged from the engaging protrusions 40f.

The valve seat member 40 disengaged form the latch members 45 is again brought into the engagements with the same to be held at the ordinary position when the valve seat member 40 is advanced relative to the valve piston 8 in the state that the plunger 21 has not been moved forward beyond the predetermined distance relative to the valve piston 8. When the valve piston 8 is moved rearward by the resilient force of the return spring 16 after the key member 22 is brought into abutting engagement with the stepped inner surface of the protruding portion 3a of the rear shell 3 with the rear end of the engaging portion 40d of the valve seat member 40 being in abutting contact on the key member 22, the valve seat member 40 is moved forward relative to the valve piston 8 to bring the forward end surface of each engaging protrusion 40f into engagement with the rear end of each claw portion 45a. Thus, the engaging protrusions 40f get through the claw portions 45a as they forcibly open the claw portions 45 against the resilient force of the garter spring 47, whereby the engaging protrusions 40f are again brought into engagements with the claw portions 45a to hold the valve seat member 40 at the ordinary position.

At the opening portion of the sliding cylindrical portion 8b of the valve piston 8, the sound-absorbing member 27 made of felt for leading the atmospheric air into the sliding cylindrical portion 8b is inserted to be axially slidable. The sound-absorbing member 27 is pressured toward the left as viewed in FIG. 2 due to the ventilation resistance of the atmospheric air passing therethrough and is brought into contact with a sliding-type plate valve 52 referred to later. The sound-absorbing member 27 has an inner hole 27a which is sufficiently larger than the diameter of the input rod 23. Thus, even when the input rod 23 is swung as shown in FIG. 5, the sound-absorbing member 27 does not interfere with the input rod 23 and is enabled to absorb sound without being deformed. A bypass passage 51 which communicates directly with the atmosphere is formed between the inner hole 27a of the sound-absorbing member 27 and the outer surface of the input rod 23.

At the rear end of the spring seat 37, there is provided a sliding-type plate valve 52 composed of a plurality of plate valve parts 53, 54, 55 which are relatively slidable in radial directions and separable in the axial direction. In the first embodiment, the sliding-type plate valve 52 is composed of three plate valve parts 53, 54, 55. The first plate valve part 53 is provided bodily on the rear end of the spring seat 37, and second and third plate valve parts 54, 55 provided between the first plate valve part 53 and the sound-absorbing member 27 to be slidable relatively in radial directions. The sound-absorbing member 27 is urged by its own expansion force into contact with the sliding-type plate valve 52, so that in an ordinary state, the three plate valve parts 53, 54, 55 and the sound-absorbing member 27 are held in contact with one another thereby to close the bypass passage 51.

The first, second and third plate valve parts 53, 54, 55 are constructed so that adjoining plate valve parts can keep the contact state therebetween through the whole circumference even when relatively slidden in any radial direction with the swing motion of the input rod 23. For this purpose, the third plate valve part 55 arranged by the side of the sound-absorbing member 27 takes the form of a ring which is nearly equal in its outer diameter to the internal diameter of the sliding cylindrical portion 8b and which is nearly equal in its inner diameter to the inner diameter of the inner hole 27a of the sound-absorbing member 27. Further, the second plate valve part 54 arranged between the first plate valve part 53 and the third plate valve part 54 takes the form of a ring whose outer diameter is smaller then the outer diameter of the third plate valve part 55 but is larger than the inner diameter of the third plate valve part 55 and whose inner diameter is larger than the inner diameter of the first plate valve part 53 but is smaller than the outer diameter of the first plate valve part 53. Thus, when the input rod 23 is swung, the swing motion of the input rod 23 is allowed by the relative sliding actions in radial directions of the three plate valve parts 53, 54, 55, and the mutual contact state between the plate valve parts 53, 54, 55 can be held throughout the whole circumference in the swinging state of the input rod 23.

Figure 3:
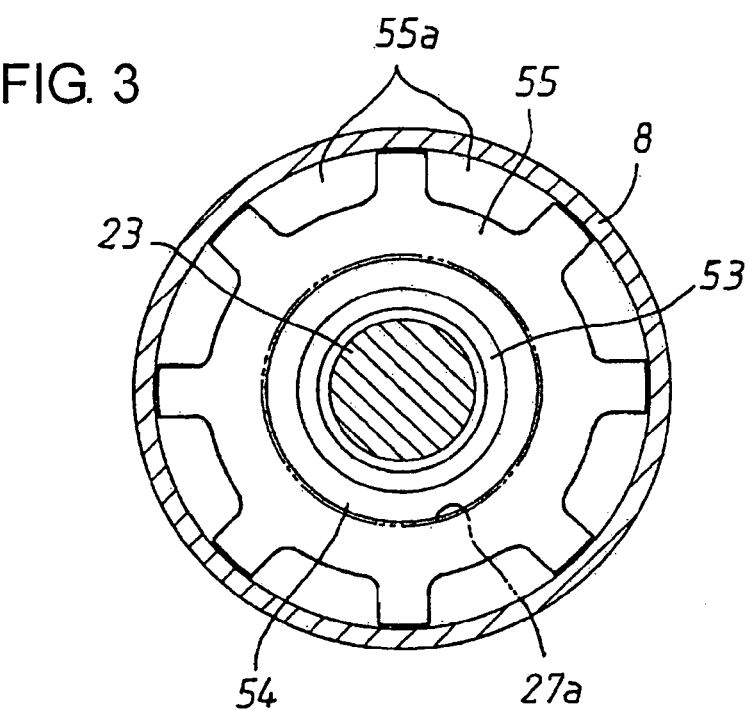
FIG. 3 is a cross-sectional view taken along the line B-B in FIG. 2 of the valve mechanism section.

As shown in FIG. 3, a plurality of opening portions 55a made of cutouts in the circumference are formed on the outer peripheral portion of the third plate valve part 55. The opening portions 55a work to secure an atmosphere passage which makes the interior of the sliding cylindrical portion 8b of the valve piston 8 communicate with the outside through the sound-absorbing member 27 at all times.

A restriction member 58 retaining a sponge-like filter element 57 which prevents dust or the like from passing therethrough is arranged between the sliding-type plate valve 52 and the annular holder 35. The restriction member 58 is fitted in the internal surface of the sliding cylindrical portion 8b of the valve piston 8 and is engaged with the annular holder 35 at its forward end portion. The filter element 57 is larger in its outer diameter than the outer diameter of the second plate valve part 54 and is larger in its inner diameter than the outer diameter of the spring 38. In the ordinary state, the expansion force of the filter element 57 itself causes the rear end surface of the filter element 57 to contact with the first plate valve part 53 at all times.

Figure 4:
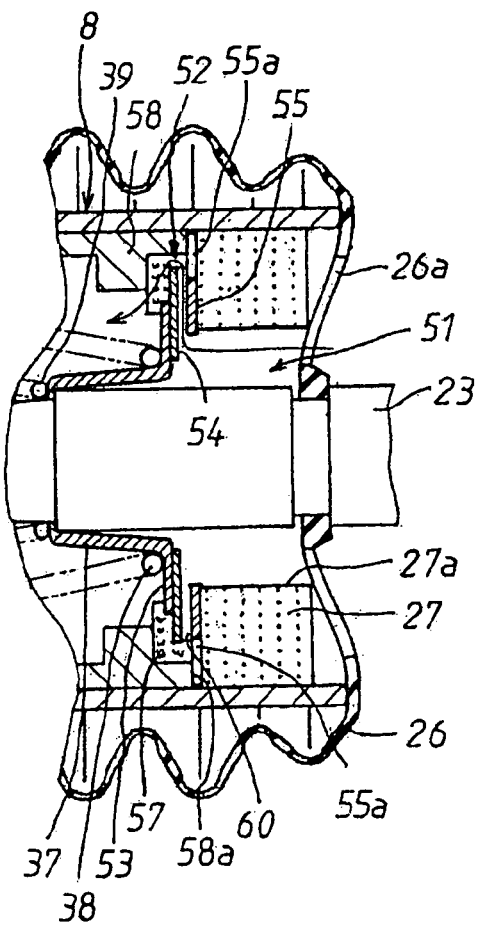
FIG. 4 is a fragmentary sectional view showing the operational state occurring when a brake pedal is stepped strongly.

A small clearance is provided between the rear end surface 58a of the restriction member 58 and the third plate valve part 55. When the input member 20 is advanced a predetermined amount relative to the valve piston 8, the sliding-type plate valve 52 is advanced while compressing the filter element 57 at the first plate valve part 53 and in such advancement, brings the third plate valve part 55 into contact with the rear end surface 58a of the restriction member 58 to prevented third plate valve part 55 from being further advanced upon such contact. As a result, the second plate valve part 54 is separated from the third plate valve part 55, so that a radial passage 60 is established between the second plate valve part 54 and the third plate valve part 55, as shown in FIG. 4.

With the construction described above, the three plate valve parts 53, 54, 55 and the sound-absorbing member 27 are held in mutual contact state at the time of a non-braking operation and at the time of an ordinary braking operation. However, when the input member 20 is advanced beyond the predetermined amount relative to the valve piston 8, the first plate valve part 53 of the sliding-type plate valve 52 is advanced bodily with the input member 20 against the resilient force of the spring 38 while compressing the filter element 57, and the sound-absorbing member 27 is advanced bodily with the input member 20 while pushing the second and third plate valve parts 54, 55 due to a pressure difference which is caused by the ventilation resistance of the atmospheric air passing therethrough. Then, when the third plate valve part 55 is brought into contact with the rear end surface 58a of the restriction member 58, the advance movements of the third plate valve part 55 and the sound-absorbing member 27 are restricted, and as a result, the second plate valve part 54 is separated from the third plate valve part 55 to establish the radial passage 60 between the second plate valve part 54 and the third plate valve part 55, whereby the bypass passage 51 comes to be opened. In this case, in dependence on the friction state of the three plate valve parts 53, 54, 55, it may take place that the second plate valve part 54 remains on the third plate valve part 55 side to separate the first plate valve part 53 from the second plate valve part 54, whereby the radial passage 60 may be established between the first plate valve part 53 and the second plate valve part 54 to open the bypass passage 51.

(Operation)

The operation of the vacuum type booster device as constructed above in the foregoing first embodiment will be described hereinafter. At the time of the ordinary operation of the brake pedal 25, the input rod 23 and the plunger 21 are advanced by the stepping of the brake pedal 25 against the resilient force of the compression spring 38, and the valve member 31 is advanced by the resilient force of the compression spring 39. This brings the first vacuum valves 31a respectively into contact with the first vacuum valve seats 8k thereby to block the communication between the variable pressure chamber 6 and the constant pressure chamber 5. As the plunger 21 is advanced further, the atmosphere valve seat 21b is separated from the atmosphere valve 31b, whereby the atmospheric air admitted into the valve piston 8 through the sound-absorbing member 27 and the filter element 57 is flown into the variable pressure chamber 6 through the atmosphere valve 31b.

Thus, a pressure difference is generated between the variable pressure chamber 6 and the constant pressure chamber 5, and the diaphragm 4, the plate 7 and the valve piston 8 are moved forward due to the pressure difference thereby to advance the output rod 14 through the reaction member 17. Accordingly, the master piston 13 is pushed forward by the output rod 14, so that pressurized brake oil is generated in the master cylinder 11 in dependence on the stepping force exerted on the brake pedal 25.

In the aforementioned ordinary operation of the brake pedal 25, the moving amount of the input rod 23 relative to the valve piston 8 is small, and it does not take place that the three plate valve parts 53, 54, 55 of the sliding-type plate valve 52 are separated from one another. Thus, the bypass passage 51 is held in the closed state. Further, the valve seat member 40 and the latch members 45 remain in the engaged state shown in FIG. 2, and the second vacuum valve seats 40b remain separated from the valve member 31.

The valve piston 8 elastically deforms the reaction member 17 by the operating force which corresponds to the pressure difference between the both chambers 5, 6 acting on the diaphragm 4 and pushes the master piston 13 through the reaction member 17 and the output rod 14. When elastically deformed, the reaction member 17 is partly flown into the reaction force hole 8d thereby to push the forward end of the forward end rod portion 21a of the plunger 21 rearward through the abutting member 19. Thus, the plunger 21 is retracted relative to the valve piston 8 to make the atmosphere valve seat 21b take seat on the atmosphere valve 31b, whereby the communication of the variable pressure chamber 6 with the atmosphere is blocked to hold a desired pressure of the brake oil. During this operation, the force exerted on the brake pedal 25 is transmitted through the input rod 23 from the forward end rod portion 21a of the plunger 21 to the reaction member 17. Since the reaction member 17 is elastically deformed in dependence on the stepping force, the driver can feel a reaction force corresponding to the deformation of the reaction member 17.

When the brake pedal 25 is released after the braking operation, the plunger 21 together with the input rod 23 is moved by the resilient force of the compression spring 38 rearward relative to the valve piston 8. Thus, the plunger 21 brings the atmosphere valve seat 21b into contact with the atmosphere valve 31b and moves the valve member 31 rearward relative to the valve piston 8 against the resilient force of the compression spring 39, whereby the first vacuum valves 31a are separated from the first vacuum valve seats 8k. As a result, the vacuum pressure in the constant pressure chamber 5 is led to the variable pressure chamber 6 by way of the communication passages 8m to make zero the pressure difference between the variable pressure chamber 6 and the constant pressure chamber 5. Therefore, the valve piston 8, the plate 7 and the diaphragm 4 are moved rearward by the resilient force of the return spring 16 provided in the booster shell 1, and with the rearward movement of the diaphragm 4, the master piston 13 is moved rearward by the resilient force of a compression spring (not shown) to be returned to the origin with the result that no pressure of the brake oil is generated in the master cylinder 11.

The plunger 21 is stopped at the same time as the key member 22 is brought into contact with the stepped inner surface of the protruding portion 3a of the rear shell 3, while the valve piston 8 is stopped in contact with the key member 22. Thus, while the brake is not being applied, the first vacuum valves 31a remain very close to the first vacuum valve seats 8k, so that when the brake begins to be applied then, the first vacuum valves 31a can quickly come into contact with the first vacuum valve seats 8k as soon as the valve member 31 is moved forward.

When the brake pedal 25 is stepped on strongly or sharply, on the contrary, the input rod 23 is advanced relative to the valve piston 8 through a longer distance than it is done at the time of the ordinary braking. When the input rod 23 is advanced beyond the predetermined distance relative to the valve piston 8, the sliding-type plate valve 52 together with the input rod 23 is moved against the resilient force of the compression spring 38 while compressing the filter element 57. At this time, the sound-absorbing member 27 is advanced bodily with the input rod 23 and the sliding-type plate valve 52 because it is pushed forward (toward the left as shown in FIG. 2) due to the ventilation resistance of the atmospheric air passing therethrough. Then, when the advancements of the third plate valve part 55 and the sound-absorbing member 27 are restricted upon contact of the third plate valve part 55 with the rear end surface 58a of the restriction member 58, the second plate valve part 54 is separated from the third plate valve part 55, whereby the radial passage 60 is established between the second plate valve part 54 and the third plate valve part 55 to open the bypass passage 51.

Thus, besides the atmospheric air which flows into the variable pressure chamber 6 through the sound-absorbing member 27, the filter element 57 and the atmosphere valve 31b in the same manner as described above, the atmospheric air which does not pass through the sound-absorbing member 27 is directly admitted from the bypass passage 51 through the radial passage 60 between the second and third plate valve parts 54, 55, the filter element 57 and the atmosphere valve 31b into the variable pressure chamber 6.

Accordingly, when the brake pedal 25 is stepped on strongly or sharply, the atmospheric air of a sufficient volume is admitted without passing through the sound-absorbing member 27 and by way of the bypass passage 51 into the variable pressure chamber 6 without delay, so that it can be realized to precisely enhance the responsiveness in operation at the time of the sharp braking. Thereafter, when the valve piston 8 follows the advancement of the input rod 23, the restriction by the restriction member 58 can be released, which allows the third plate valve part 55 and the sound-absorbing member 27 to advance, whereby the three plate valve parts 53, 54, 55 and the sound-absorbing member 27 are again held in the mutual contact state.

The manipulation of the brake pedal 25 causes the input rod 23 to swing about the pivotal center (i.e., the center of the front spherical surface) of the same, as shown in FIG. 5. The sound-absorbing member 27 has the inner hole 27a which is sufficiently large to allow the swing motion of the input rod 23, the respective plate valve parts 53, 54, 55 of the sliding-type plate valve 52 are relatively slidable in radial directions, and the sound-absorbing member 27 is deformable to yield to the inclination of the sliding-type plate valve 52. Thus, in the swing motion of the input rod 23, the three plate valve parts 53, 54, 55 and the sound-absorbing member 27 remain in the contact state, whereby the closed state of the bypass passage 51 can be secured.

Next, description will be made regarding the operation at the time of an emergency braking wherein the driver steps the brake pedal 25 quickly. The emergency braking property can be accomplished by varying the jumping property so that a larger propelling force than that at the time of the ordinary braking is exerted on the output member 14. In order to vary the jumping property, it can be done to make a larger clearance between the abutting member 19 and the reaction member 17. That is, by shifting the atmosphere valve 31b rearward, the clearance can be enlarged to increase the output power which is applied until the abutting member 19 comes to receive the reaction force from the reaction member 17. Thus, the output power in a so-called jumping state wherein the ratio of the output power to the input power becomes infinity is made to be larger than that in the ordinary state.

The jumping property in which the ratio of the output power to the input power becomes infinity is determined in dependence upon a distance through which the plunger 21 is advanced from the time that the atmosphere valve seat 21b begins to separate from the atmosphere valve 31b with the first vacuum valves 31a being in contact with the first negative valve seats 8k, by the time that the abutting member 19 is brought into contact with the reaction member 17. At the time of the emergency braking, because the second vacuum valve seats 40b are brought into contact with the second vacuum valve 31c formed on the valve member 31, to move the valve member 31 rearward, the distance through which the plunger 21 is advanced from the time that the atmosphere valve seat 21b begins to separate from the atmosphere valve 31b to the time that the abutting member 19 comes to contact with the reaction member 17 becomes longer than that at the time of the ordinary braking, and the distance by which the atmosphere valve seat 21b is separated from the atmosphere valve 31b during the same period of time becomes long. Thus, the variable pressure chamber 6 is caused to communicate with the atmosphere compulsorily and quickly, whereby a larger propelling force than that at the time of the ordinary braking is outputted to the output member 14 to heighten the jumping property.

As described earlier, at the time of the emergency braking wherein the driver steps the brake pedal 25 quickly, the plunger 21 is advanced beyond the predetermined distance relative to the valve piston 8. Thus, the large diameter portion of the forward end rod portion 21a of the plunger 21 pushes the cam surfaces 45b of the latch members 45 to disengage the claw portions 45a from the engaging protrusions 40f. As a result, the latch members 45 are pushed radially outward against the resilient force of the garter spring 47, and hence, the valve seat member 40 is released from the latch members 45. This allows the valve seat member 40 to retract the predetermined amount rearward by means of the resilient force of the compression spring 43, and the second vacuum valve seats 40b are brought into contact with the valve member 31 to retract the same, whereby the atmosphere valve 31b is separated from the atmosphere valve seat 21b. The retraction of the valve seat member 40 relative to the valve piston 8 is restricted when the rear end of the engaging portion 40d comes into engagement with the key member 22 remaining in contact with the rear end surfaces of the rectangular holes 8i. Thus, the variable pressure chamber 6 is caused to communicate with the atmosphere compulsorily and quickly, whereby the larger propelling force than that at the time of the ordinary braking is outputted to the output member 14 with the result that a higher pressure is delivered from the master cylinder 11. With the increase of the output power, the reaction member 17 partly flows into the reaction force hole 8d to push the plunger 21 back through the abutting member 19. Thus, the atmosphere valve seat 21b is brought into contact with the atmosphere valve 31b to block the inflow of the atmospheric air, whereby the output power at the time of the emergency braking can be determined.

At the time of the emergency braking, the atmospheric air is admitted into the valve piston 8 without passing through the sound-absorbing member 27 and without delay as mentioned earlier, so that a large braking force can be outputted with a high responsiveness at the time of the emergency braking.

When the brake pedal 25 is released, the resilient force of the compression spring 38 causes the plunger 21 to be moved rearward relative to the valve piston 8 and the valve member 31. The second vacuum valve 31c is separated from the second vacuum valve seat 40b to make the variable pressure chamber 6 communicate with the constant pressure chamber 5. Thus, the output power is lowered to allow the valve piston 8 to be moved rearward by the resilient force of the return spring 16. When the valve piston 8 is retracted rearward by the resilient force of the return spring 16 after the key member 22 is brought into contact with the stepped inner surface of the protruding portion 3a of the rear shell 3, the valve seat member 40 which has been in contact with the key member 22 at the rear end of the engaging portion 40d is advanced relative to the valve piston 8. This brings the forward end surfaces of the engaging protrusions 40f into engagements with the end surfaces of the claw portions 45a. Thus, the latch members 45 are pushed radially outward against the resilient force of the garter spring 47 to allow the claw portions 45a to pass over and after passing, are returned by the resilient force of the garter spring 47 to bring the claw portions 45 into engagements with the annular engaging protrusion 40f, whereby the valve seat member 40 is latched at the ordinary position.

In the foregoing first embodiment, the sliding-type plate valve 52 is composed of three plate valve parts 53, 54, 55 which are relatively slidable in radial directions and which are separable in the axial direction. However, where the swing motion angle of the input rod 23 is not so much large, the sliding-type plate valve 52 may be composed of at least two plate valve parts, that is, may be composed of the first and third plate valve parts 53, 55 by the omission of the second plate valve part 54 in the foregoing first embodiment, and the same function as aforementioned can be accomplished by the sliding-type plate valve 52 so modified.

In the foregoing first embodiment, the filter element 57 is made to contact with the sliding-type plate valve 52 (i.e., with the first plate valve part 53) at the time of the ordinary operation (i.e., at the time of non-braking operation). However, in a modified form, a slight clearance may be provided between the filter element 57 and the first plate valve part 53, and at the time of the ordinary operation, the first plate valve part 53 may be brought into contact with the filter element 57 before the bypass passage 51 is opened. Further, the filter element 57 with which the sliding-type plate valve 52 is brought into contact is not the essential component and can be omitted.

Although in the foregoing first embodiment, description has been made regarding the vacuum type booster device with an emergency braking function which is capable of outputting a larger brake force than that at the time of the ordinary braking by varying the jumping property at the time of the emergency braking, the emergency braking function is necessarily not required in practicing the present invention, and the present invention may of course be applicable to a vacuum type booster device which does not have the emergency braking function. In this modified case, the first vacuum valve seats 8k, the first vacuum valves 31a, the atmosphere valve seat 21b and the atmosphere valve 31b shown in FIG. 2 respectively serve as vacuum valve seats, vacuum valves, an atmosphere valve seat and an atmosphere valve in the vacuum type booster device not having the emergency braking function.

Although in the foregoing first embodiment, description has been made regarding the example wherein the sliding-type plate valve 52 has formed the plurality of opening portions 55a made of cutouts, at the outer periphery of the third plate valve part 55 for securing the air passage into the valve piston 8, the opening portions 55a may be a plurality of holes which pass through on a circle at the outer peripheral portion of the third plate valve part 55, in place of the cutouts, and the communication with the atmosphere can be made through the plural holes.

Second Embodiment

Figure 6:
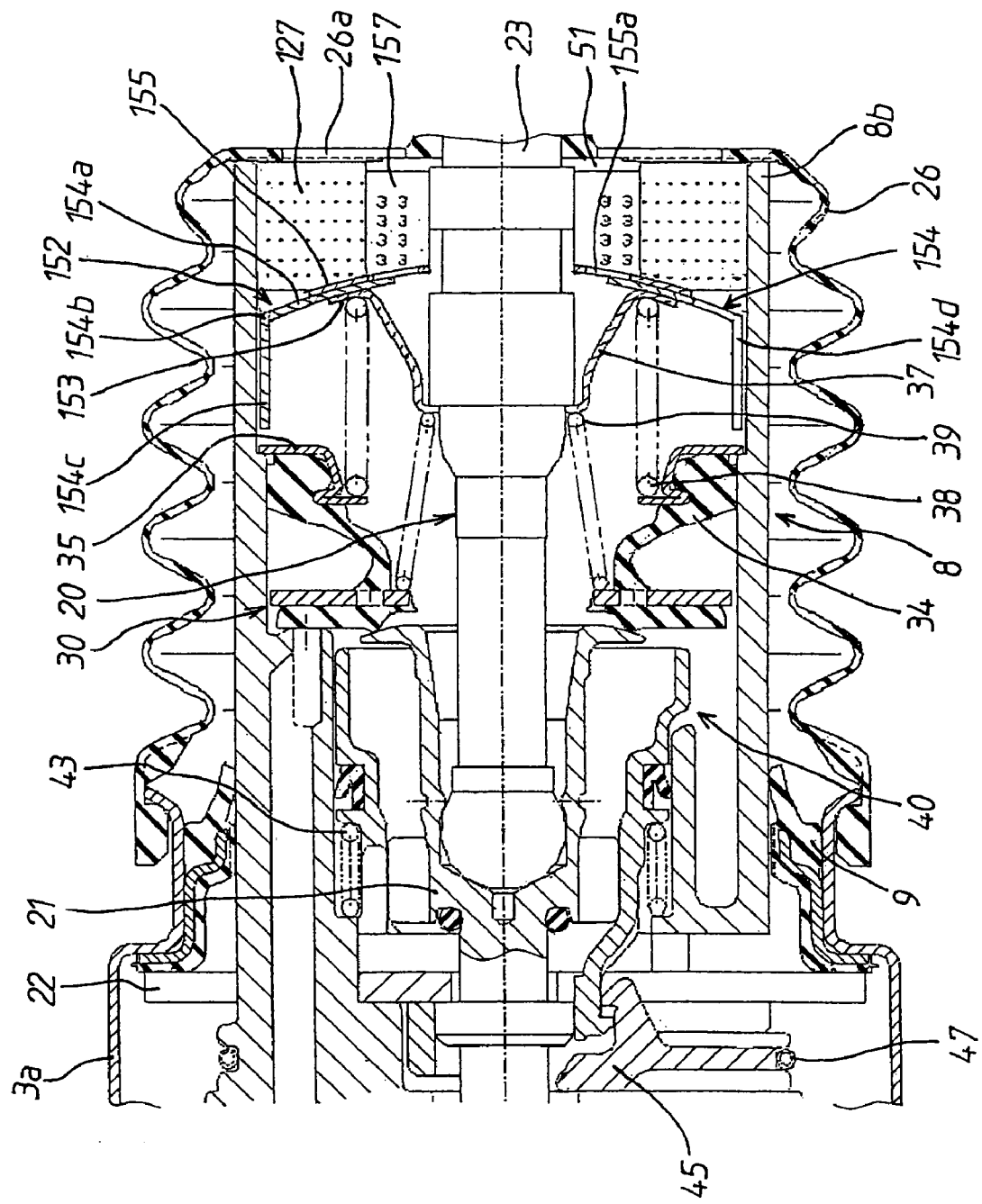
FIG. 6 is an enlarged fragmentary sectional view, taken along the line A-A in FIG. 1, of a valve mechanism section incorporated in the vacuum type booster device in a second embodiment according to the present invention.
Figure 7:
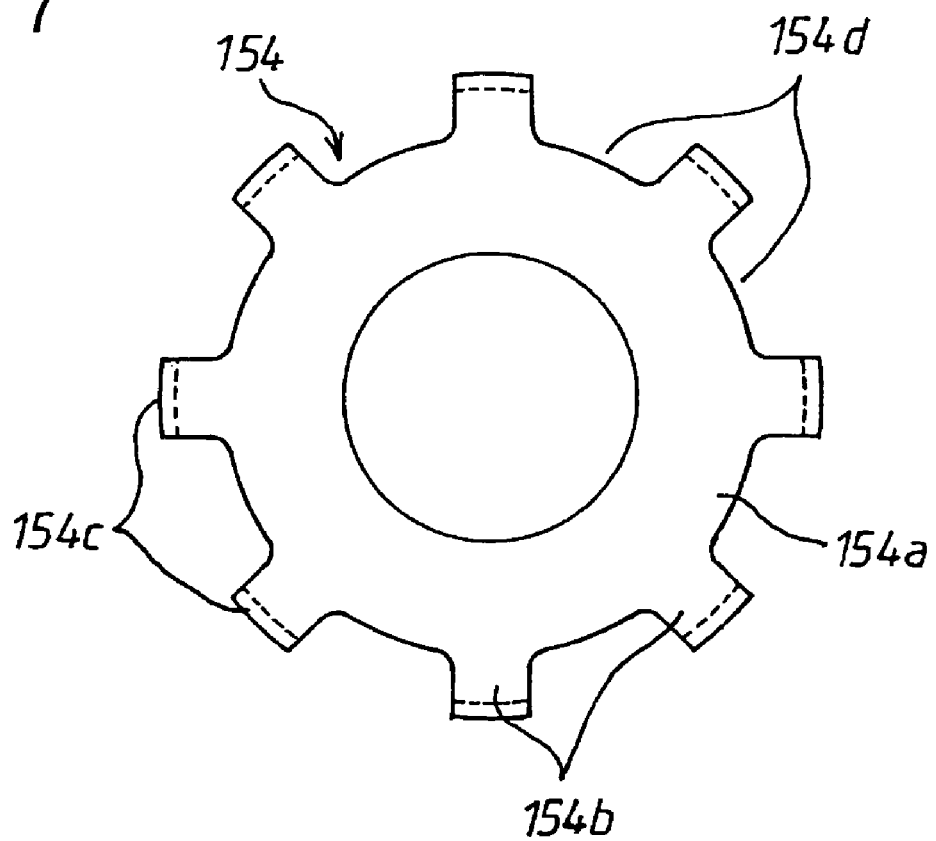
FIG. 7 is a front view of a second plate valve part in the second embodiment.
Figure 8:
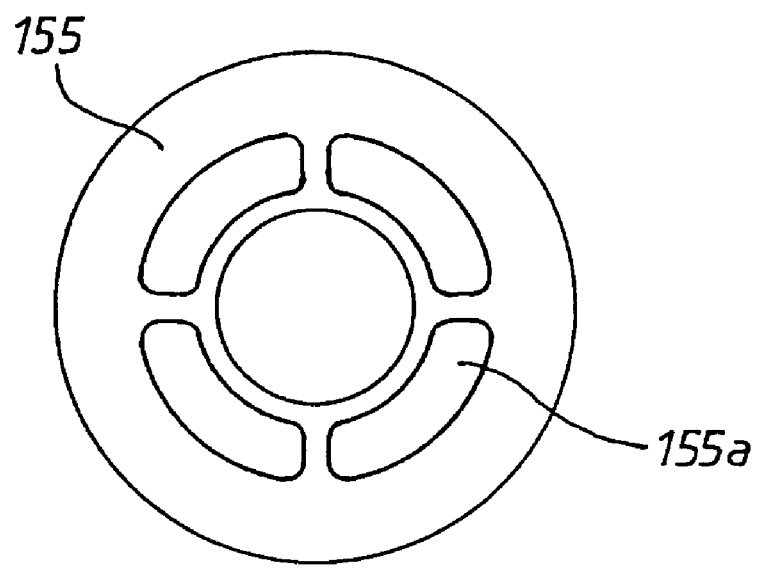
FIG. 8 is a front view of a third plate valve part in the second embodiment.

FIGS. 6 through 8 show a second embodiment according to the present invention, and the second embodiment is different from the first embodiment in the respects that the second plate valve part 54 located at the middle of the three plate valve parts in the first embodiment is integrated with the restriction member 58 and that the filter element 57 fitted in the restriction member 58 is arranged between the internal surface of the sound-absorbing member 27 and the outer surface of the input rod 23. Therefore, the following description will be made mainly in the respects different from the first embodiment, and the description regarding the same components as those in the first embodiment will be omitted in place of putting the same reference numerals on the same components.

As shown in FIG. 6, a sponge-like filter element 157 is fitted between the internal surface of a sound-absorbing member 127 made of felt, which is axially movably fitted in the internal surface of the opening end of the sliding cylindrical portion 8b of the valve piston 8, and the outer surface of the input rod 23 passing through the sound-absorbing member 127. A sliding-type plate valve 152 composed of first, second and third plate valve parts 153, 154, 155 which are relatively slidable in about radial directions and separable in the axial direction is arranged on the input rod 23 between the sound-absorbing member 127 and the spring seat 37 immovably engaged with the input rod 23.

The first plate valve part 153 is provided bodily with the rear end of the spring seat 37 immovably engaged with the intermediate portion of the input rod 23 and is formed to be a spherical shape which takes its spherical center at the pivotal center of the input rod 23.

The second plate valve part 154 has a spherical portion 154a which is spherically contacted with the first plate valve part 153 to be slidable in about radial directions, and the inner diameter of a center hole of the spherical portion 154a is set to such a dimension which does not close ventilation holes 155a formed on the third plate valve part 155 referred to later. As shown in FIG. 7, a plurality of protrusion portions 154b are formed at the outer periphery of the spherical portion 154a of the second plate valve part 154 at regular intervals in the circumferential direction. The protrusion portions 154b are bent in parallel to the internal surface of the sliding cylindrical portion 8b of the valve piston 8 thereby to constitute restriction portions 154c, and the forward ends of the restriction portions 154c are extended to a position close to the annular holder 35. Thus, the second plate valve part 154 has at the outer periphery of the spherical portion 154a a plurality of cutout or hollow portions 154d each between adjoining protrusion portions 154b, so that the atmospheric air passing through the sound-absorbing member 127 is admitted into the valve mechanism 30 by way of the hollow portions 154d.

The third plate valve part 155 of a spherical shape which is spherically contacted with the spherical portion 154a of the second plate valve part 154 to be slidable in about radial directions is loosely fitted on the outer surface of the input rod 23 between the second plate valve part 154 and the sound-absorbing member 127. The outer circumferential portion of the third plate valve part 155 is kept in contact with an internal surface portion at the inside end surface of the sound-absorbing member 127, whereby the sound-absorbing member 127 is kept by its expansion force in face-to-face contact with the third plate valve part 155. The inner diameter of the third plate valve part 155 is made to be in nearly coincidence with the inner diameter of the filter element 157, and the inside end surface of the filter element 157 is kept in contact with the third plate valve part 155. The outer diameter of the third plate valve part 155 is set to reside in the radial intermediate position of the sound-absorbing member 127, so that the atmospheric air can be admitted over the outer periphery of the sound-absorbing member 127. As shown in FIG. 8, the plurality (four in this embodiment) of elongated ventilation holes 155*a* opening to the inside end surface of the filter element 157 are circumferentially formed at the inner circumferential portion of the third plate valve part 155.

In the ordinary state, the first, second and third plate valve parts 153, 154, 155 and the sound-absorbing member 127 are held in contact with one another by means of the resilient force of the compression spring 38 which is interposed between the annular holder 35 and the spring seat 37 to close the bypass passage 51. Thus, in the ordinary state, the atmospheric air passing through the sound-absorbing member 127 is admitted into the sliding cylindrical portion 8*b* through the hollow portions 154*d* of the second plate valve part 154.

However, when the advancement of the second plate valve part 154 is stopped upon contact of the restriction portions 154*c* of the second plate valve part 154 with the annular holder 35 with the advance amount of the input rod 23 relative to the valve piston 8 exceeding the predetermined amount, the first plate valve part 153 is separated from the second plate valve part 154 to form a radial passage between the first plate valve part 153 and the second plate valve part 154, whereby the bypass passage 51 which is provided between the sound-absorbing member 127 and the input rod 23 to pass through the filter element 157 comes to be opened.

(Operation)

Next, the operation of the foregoing second embodiment will be described. At the time of an ordinary operation state wherein the restriction portions 154*c* of the second plate valve part 154 are not contacted with the annular holder 35 because the advance amount of the input rod 23 relative to the valve piston 8 is less than the predetermined value, the three plate valve parts 153, 154, 155 are advanced bodily with the input rod 23. At this time, the sound-absorbing member 127 is pushed toward the left as viewed in FIG. 6 due to the pressure difference which is generated by the ventilation resistance of the atmospheric air passing through the sound-absorbing member 127 and is advanced bodily with the plate valve parts 153, 154, 155. Further, since the sound-absorbing member 127, the input rod 23 and the plate valve parts 153, 154, 155 advance through the same amount, the filter element 157 is advanced bodily with these members.

Thus, the first, second and third plate valve parts 153, 154, 155 and the sound-absorbing member 127 are held in contact with one another, and the bypass passage 51 which is provided between the sound-absorbing member 127 and the input rod 23 to pass through the filter element 157 remains closed, whereby the atmospheric air passing the sound-absorbing member 127 is admitted into the sliding cylindrical portion 8*b* of the valve piston 8 by way of the hollow portions 154*d* of the second plate valve part 154 and is flown toward the valve mechanism 30.

At the time of a quick operation wherein the advance amount of the input rod 23 relative to the valve piston 8 is equal to or greater than the predetermined value to bring the second plate valve part 154 into contact with the annular holder 35, that is, at the time of an emergency braking wherein the brake pedal is stepped strongly or abruptly, the restriction portions 154*c* of the second plate valve part 154 are brought into contact with the annular holder 35 to be stopped from further advancing, whereby stopping takes place as well on the first and third plate valve parts 153, 155 being held in contact with the second plate valve part 154 as well as on the sound-absorbing member 127 and the filter element 157 being held in contact with the third plate valve part 155. However, since the input rod 23 and the first plate valve part 153 are further advanced, the first plate valve part 153 is separated from the second plate valve part 154. As a result, a clearance (a radial passage) is formed between the first plate valve part 153 and the second plate valve part 154. By the formation of this clearance, the bypass passage 51 passing through the filter element 157 is opened, whereby the atmospheric air is admitted into the sliding cylindrical portion 8*b* of the valve piston 8 by way of the bypass passage 51.

As a consequence, in addition to the atmospheric air flown into the valve mechanism 30 through the sound-absorbing member 127, the atmospheric air can be flown, in a similar manner as in the first embodiment, directly into the valve mechanism 60 through the filter element 157 and then through the clearance (radial passage) between the first and second plate valve parts 153, 154 without passing through the sound-absorbing member 127.

Where the input rod 23 is swung about its pivotal center during the operation, the first and third plate valve parts 153, 155 are slidden in about a radial direction while being held in the spherical contact with the second plate valve part 154.

In the foregoing second embodiment, since the restriction portions 154*c* are formed bodily with the second plate valve part 154, the number of the components can be reduced in comparison with the first embodiment, so that it becomes possible to further reduce the cost for the vacuum type booster device.

Although in the foregoing second embodiment, the plate valve parts 153, 154, 155 constituting the sliding-type plate valve 152 are formed to be spherical shapes each taking its spherical center on the pivotal center of the input rod 23, it is not necessarily the essential requirement for the present invention to make each plate valve part 153, 154, 155 to take the spherical shape. As is the case of the modification of the first embodiment, the plate valve parts 153, 154, 155 may be jointed to be slidable in radial directions, and the number of the plate valve parts may be reduced by removing the third plate valve part 155 for example thereby to make the sliding-type plate valve 152 composed of two members including the first and second plate valve part 153, 154.

Although by making each plate valve part 153, 154, 155 take a spherical shape, the sliding direction of the plate valve parts does not become radial directions in a strict sense, it is needless to say that the sliding in about radial directions in the second embodiment is encompassed, in a substantial meaning, in the sliding in the radial directions as defined in the claimed inventions.

Finally, various features and many of the attendant advantages in the foregoing embodiments will be summarized as follows:

In the foregoing first embodiment typically shown in FIGS. 2 and 4, it can be realized to admit the atmospheric air directly inside the valve piston 8 through the bypass passage 51 provided between the sound-absorbing member 27 and the input rod 23, so that the responsiveness in the braking operation can be heightened reliably. In addition, since the vacuum type booster device takes the construction that the bypass passage 51 is selectively opened and closed by the sliding-type plate valve 52 composed of the at least two plate valve parts 53, 55 which are relatively slidable in radial directions and separable in the axial direction, the heightening of the responsiveness in the braking operation can be achieved with a construction which is very simple and compact.

Also in the foregoing first embodiment typically shown in FIGS. 2 and 5, since the sliding-type plate valve 52 is composed of three plate valve parts 53, 54, 55 which are relatively slidable in radial directions, it is possible to allow the input rod 23 to swing within a large swinging range and to hold the respective plate valve parts 53, 54, 55 in the mutual contact state easily and reliably even when the input rod 23 is swung.

Also in the foregoing first embodiment typically shown in FIGS. 2 and 5, since when the input rod 23 is advanced beyond the predetermined distance relative to the valve piston 8, the restriction member 58 restricts the further advancement of the plate valve part 53 which is arranged by the sound-absorbing member 27, upon contact therewith, it is possible to separate the sliding-type plate valve 52 reliably in the axial direction, so that the bypass passage 51 can be opened in a reliable manner.

Also in the foregoing first embodiment typically shown in FIG. 5, since the sound-absorbing member 27 has the internal surface 27a which is sufficiently large not to interfere with the input rod 23 even when the same is swung, it is possible for the sound-absorbing member 27 to perform the sound absorbing function without being deformed by the input rod 23.

Further, in the foregoing first embodiment typically shown in FIGS. 2 and 3, since the air passage which admits the atmospheric air through the sound-absorbing member 27 to the atmosphere valve 31b inside the valve piston 8 is secured at all times by the opening portions 55a formed on the outer periphery of the plate valve part 55 which is held in contact with the end surface of the sound-absorbing member 27, it can be realized to admit the atmospheric air inside the valve piston through the sound-absorbing member 27 all the times without enlarging the valve piston 8 in spite of the provision of the sliding-type plate valve 52.

In the foregoing second embodiment typically shown in FIGS. 6-8, since the sliding-type plate valve 152 is composed of three plate valve parts 153, 154, 155 which are relatively slidable in radial directions, substantially the same advantages as those in the foregoing first embodiment can be accomplished.

In addition, in the foregoing second embodiment typically shown in FIGS. 6-8, since the plate valve parts 153, 154, 155 are held in contact with one another at their spherical surfaces each taking its spherical center at the pivotal center of the input rod 23, relative sliding movements therebetween in radial directions can be maintained smooth even when the input rod 23 is swung about its pivotal center.

Furthermore, in the foregoing second embodiment typically shown in FIGS. 6-8, since of the three plate valve parts 153, 154, 155, the second plate valve part 154 is held immovably in radial directions, the first and third plate valve parts 153, 155 can be slidden smoothly along the spherical portion 154a of the second plate valve part 154, so that the operation of the sliding-type plate valve 152 can be performed reliably as a whole.

Obviously, numerous further modifications and variations of the present invention are possible in light of the above teachings. It is therefore to be understood that within the scope of the appended claims, the present invention may be practiced otherwise than as specifically described herein.

What is claimed is:

1. A vacuum type booster device comprising:

a booster shell movably supporting a partition member partitioning the interior of the booster shell into a variable pressure chamber and a constant pressure chamber;

a valve piston secured to the partition member at a base portion thereof and having a vacuum valve seat formed thereon for selective communication of the variable pressure chamber with the constant pressure chamber;

an output rod connected to the valve piston;

a reaction member for transmitting an output of the partition member depending on the pressure difference between the variable and constant pressure chambers, from the valve piston to the output rod;

a plunger operable in connection with the reaction member and having an atmosphere valve seat formed thereon;

an input rod connected to the plunger for axially moving the plunger when the input rod is axially moved by a brake pedal;

a valve member having a vacuum valve and an atmosphere valve formed thereon, the vacuum valve being contactable with the vacuum valve seat of the valve piston for making the variable pressure chamber communicate selectively with the constant pressure chamber, the atmosphere valve being contactable with the atmosphere valve seat of the plunger for making the variable pressure chamber communicate selectively with the atmosphere;

a sound-absorbing member fitted at its outer surface in the internal surface of the valve piston and having an internal surface which is sufficiently larger in diameter than the input rod for defining a bypass passage which leads the atmospheric air to the atmosphere valve inside the valve piston without passing through the sound-absorbing member; and a sliding-type plate valve composed of at least two plate valve parts which are relatively slidable in radial directions and separable from each other in an axial direction, wherein the at least two plate valve parts are held in a face-to-face contact in a first operation state for blocking the communication of the bypass passage with the atmosphere valve inside the valve piston, but are separated axially from each other in a second operation state that the input rod is advanced beyond a predetermined distance relative to the valve piston, to establish a radial passage which makes the bypass passage communicate with the atmosphere valve inside the valve piston.

2. The vacuum type booster device as set forth in claim 1, wherein the sliding-type plate valve is composed of three plate valve parts which are relatively slidable in radial directions and separable from one another in the axial direction.

3. The vacuum type booster device as set forth in claim 1, further comprising a restriction member for restricting the movement of one of the at least two plate valve parts which is arranged by the sound-absorbing member, upon contact with said one of the at least two plate valve parts in the second operation state.

4. The vacuum type booster device as set forth in claim 3, further comprising a ring-shape filter element arranged between the restriction member of a ring shape and the sliding-type plate valve, for leading the atmospheric air past the radial passage opened between the at least two plate valve parts, to the atmosphere valve inside the valve piston therethrough.

5. The vacuum type booster device as set forth in claim 1, wherein:
- the sound-absorbing member has an internal surface which is sufficiently large not to interfere with the input rod even when the same is swung; and
- the bypass passage is formed as an annular space between the internal surface of the sound-absorbing member and the outer surface of the input rod.

6. The vacuum type booster device as set forth in claim 1, wherein a plurality of opening portions are arranged on an outer periphery of one of the at least two plate valve parts which is held in contact with an end surface of the sound-absorbing member, for securing at all times an air passage which admits the atmospheric air through the sound-absorbing member to the atmosphere valve inside the valve piston.

7. The vacuum type booster device as set forth in claim 1, wherein each of the at least two plate valve parts takes the form of a thin disc encircling the circumference of the input rod.

8. The vacuum type booster device as set forth in claim 7, wherein one of the at least two plate valve parts which is closest to the atmosphere valve inside the valve piston is formed as a part of a spring seat which receives one end of a compression spring urging the atmosphere valve toward the atmosphere valve seat formed on the plunger.

9. The vacuum type booster device as set forth in claim 2, wherein the first to third plate valve parts of the sliding-type plate valve are held in contact with one another at spherical portions thereof each taking its spherical center at the pivotal center of the input rod.

10. The vacuum type booster device as set forth in claim 9, wherein the second plate valve part between the first and third plate valve parts is held immovably in radial directions and wherein the first and third plate valve parts are held to slidably contact with spherical portions formed at front and rear surfaces of the second plate valve part.

11. The vacuum type booster device as set forth in claim 9, wherein the third plate valve part is radially movable along a spherical portion which is formed at an inside end surface of the sound-absorbing member to take its spherical center at the pivotal center of the input rod, and has a plurality of ventilation holes arranged circumferentially at a radially inner portion thereof for admitting the atmospheric air inside the valve piston, the device further comprising:
- a sponge-like ring-shape filter element arranged between the internal surface of the sound-absorbing member and the outer surface of the input rod for leading the atmospheric air passing therethrough to the ventilation holes

* * * * *